United States Patent
Anunobi et al.

(10) Patent No.: US 8,423,195 B2
(45) Date of Patent: Apr. 16, 2013

(54) POWER CONSUMPTION PROJECTION

(75) Inventors: Ogechi O. Anunobi, Dallas, TX (US); Rick A. Hamilton, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/608,085

(22) Filed: Oct. 29, 2009

(65) Prior Publication Data

US 2011/0106326 A1     May 5, 2011

(51) Int. Cl.
    *G05D 11/00*    (2006.01)
(52) U.S. Cl.
     USPC ............ 700/291; 324/142; 713/300; 713/340
(58) Field of Classification Search .................. 700/291; 324/142; 713/300, 340
     See application file for complete search history.

(56) References Cited

U.S. PATENT DOCUMENTS

| | | | |
|---|---|---|---|
| 6,076,171 A * | 6/2000 | Kawata | 713/501 |
| 6,111,857 A * | 8/2000 | Soliman et al. | 370/254 |
| 6,289,267 B1 * | 9/2001 | Alexander et al. | 700/286 |
| 6,686,831 B2 * | 2/2004 | Cook et al. | 323/273 |
| 7,283,792 B2 * | 10/2007 | Chmiel | 455/69 |
| 7,590,499 B2 * | 9/2009 | Ha et al. | 702/60 |
| 7,747,357 B2 * | 6/2010 | Murdoch | 700/295 |
| 7,992,011 B2 * | 8/2011 | Yasuda et al. | 713/300 |
| 2005/0251697 A1 * | 11/2005 | Narukawa et al. | 713/310 |
| 2006/0084391 A1 * | 4/2006 | Chmiel | 455/69 |
| 2006/0117766 A1 * | 6/2006 | Singh et al. | 62/129 |
| 2007/0208714 A1 | 9/2007 | Ture et al. | |
| 2007/0208755 A1 | 9/2007 | Bhatkar et al. | |
| 2007/0209080 A1 | 9/2007 | Ture et al. | |
| 2007/0242647 A1 * | 10/2007 | Bennett | 370/338 |
| 2007/0249386 A1 * | 10/2007 | Bennett | 455/550.1 |
| 2007/0259659 A1 * | 11/2007 | Bennett | 455/422.1 |
| 2007/0277046 A1 * | 11/2007 | Yasuda et al. | 713/300 |
| 2008/0001595 A1 * | 1/2008 | Ha et al. | 324/142 |
| 2008/0028246 A1 * | 1/2008 | Witham | 713/330 |
| 2008/0114997 A1 * | 5/2008 | Chin | 713/321 |
| 2008/0220803 A1 * | 9/2008 | Lee et al. | 455/522 |
| 2009/0063257 A1 * | 3/2009 | Zak et al. | 705/10 |
| 2009/0077407 A1 * | 3/2009 | Akimoto | 713/340 |
| 2009/0106271 A1 | 4/2009 | Chieu et al. | |
| 2009/0119523 A1 * | 5/2009 | Totten | 713/322 |
| 2010/0091714 A1 * | 4/2010 | Bennett | 370/328 |
| 2010/0191385 A1 * | 7/2010 | Goodnow et al. | 700/291 |

* cited by examiner

*Primary Examiner* — Mohammad Ali
*Assistant Examiner* — Anthony Whittington
(74) *Attorney, Agent, or Firm* — William E. Schiesser; Ronald A. D'Alessandro; Keohane & D'Alessandro PLLC (57) ABSTRACT

The present invention provides a way to more effectively estimate energy usage by devices such as servers, including traditional mainframes as well as other enterprise systems. One core idea surrounds the fact that when detailed power consumption information is unavailable for a specific configuration, power consumption is computed/projected/estimated by de-rating the maximum power rating by a power adjustment factor that would more closely project the true power consumption. Under this approach, the power consumption is then provided as a range specifying probable expected lower and upper limits for a given device. This range is more meaningful for planning and decision-making and shows the client a more likely best and worst case energy consumption scenario for their specific device(s), and hence is helpful for planning or server comparison decisions. Cooling, energy costs, energy efficiency, and energy expanded per MIPS are also projected and given as a range instead of a single number. This gives the IT decision maker more accurate information upon which to base IT decision-making.

22 Claims, 4 Drawing Sheets

FIG. 1

| AC INPUT | 100-240V ~ | | 19A-10A | 60-50Hz | | | 220Vac 50Hz | |
|---|---|---|---|---|---|---|---|---|
| DC OUTPUT | +3.3V | +5V | +12V₁ | +12V₂ | +12V₃ | +12V₄ | +12V₅ | +12V₆ | -12V | +5Vsb |
| PEAK | 40A | 40A | 20A | 20A | 28A | 28A | 28A | 20A | 08A | 6A |
| MAX POWER | 250W | | | | 1125W | | | | 9.6W | 30W |
| | | | | | 1250W | | | | | |

CAUTION

- HAZARDOUS VOLTAGE INSIDE!
- DO NOT OPEN POWER SUPPLY COVER!
- SELECT THE RIGHT INPUT VOLTAGE!

FIG. 2

| MACHINE TYPE-MODEL | INSTALLED FEATURES/QUANTITY | POWER CONSUMPTION |
|---|---|---|
| ACME-10A | CP/10  FC/8  EN/6 | 160 WATTS |
| ACME-10A | CP/12  FC/8  EN/6 | 180 WATTS |

FIG. 3A

| MACHINE TYPE-MODEL | CP/WATTS | FC/WATTS | EN/WATTS |
|---|---|---|---|
| ACME-10A | 10 | ? | ? |

FIG. 3B

| MACHINE TYPE-MODEL | MIPS | POWER CONSUMPTION |
|---|---|---|
| ACME-10A | 10 | 160 WATTS |
| ACME-10A | 20 | 350 WATTS |

# POWER CONSUMPTION PROJECTION

FIELD OF THE INVENTION

The present invention generally relates to power consumption projection. Specifically, the present invention provides a way to project actual power consumption of devices (e.g., Integrated Technology (IT) devices) by adjusting maximum power consumption ratings.

BACKGROUND OF THE INVENTION

In today's world, rising energy costs and data centers that have maximized their power from the grid are the order of the day. IT executives are asking about the energy impact of their server acquisitions or server upgrades. They want an understanding of the potential energy consumption, savings, and energy efficiency gains, as it is fast becoming an important consideration in system data center solutions. In some cases this may be a limiting factor in the IT decision making. This invention helps to solve this problem.

Today, name plate power ratings are available for many devices (e.g., servers). However, these plates often declare the maximum power with every possible feature installed, which most machines never achieve. Thus, this number is not helpful for planning purposes. Moreover, it may be challenging to physically go and read off the power ratings from servers. A quick summary is usually required. Existing tools for power consumption analysis in this space are either too broadly defined or lack device information so that the client is "back to square one" trying to understand the energy consumption of existing servers or potential servers.

SUMMARY OF THE INVENTION

The present invention provides a way to more effectively estimate energy usage by devices such as servers, including traditional mainframes as well as other enterprise systems. One core idea surrounds the fact that when detailed power consumption information is unavailable for a specific configuration, power consumption is computed/projected/estimated by downwardly adjusting (de-rating) the maximum power rating by a power adjustment factor that would more closely project the true power consumption. Under this approach, the power consumption is then provided as a range specifying probable expected lower and upper limits for a given device. This range is more meaningful for planning and decision making and shows the client a more likely best and worst case energy consumption scenario for their specific device(s), and hence is helpful for planning or server comparison decisions. Cooling, energy costs, energy efficiency, and energy expanded per Million Instructions Per Second (MIPS) are also projected and given as a range instead of a single number. This gives the IT decision maker more accurate information upon which to base IT decision-making.

A first aspect of the present invention provides a method for projecting power consumption, comprising: identifying a set of devices of an infrastructure whose power consumption is to be projected; determining a maximum power consumption of the set of devices; determining a power adjustment factor for the set of devices, the power adjustment factor representing a typical level of power consumption as compared to the maximum power consumption; and adjusting the maximum power consumption by the power adjustment factor to derive a projected power consumption for the set of devices.

A second aspect of the present invention provides a data processing system for projecting power consumption, comprising: a memory medium comprising instructions; a bus coupled to the memory medium; and a processor coupled to the bus that when executing the instructions causes the data processing system to identify a set of devices of an infrastructure whose power consumption is to be projected; determine a maximum power consumption of the set of devices; determine a power adjustment factor for the set of devices, the power adjustment factor representing a typical level of power consumption as compared to the maximum power consumption; and adjust the maximum power consumption by the power adjustment factor to derive a projected power consumption for the set of devices.

A third aspect of the present invention provides a computer readable storage medium containing a program product for projecting power consumption, the computer readable storage medium comprising program code for causing a computer to: identify a set of devices of an infrastructure whose power consumption is to be projected; determine a maximum power consumption of the set of devices; determine a power adjustment factor for the set of devices, the power adjustment factor representing a typical level of power consumption as compared to the maximum power consumption; and adjust the maximum power consumption by the power adjustment factor to derive a projected power consumption for the set of devices.

A fourth aspect of the present invention provides a method for deploying a system for projecting power consumption, comprising: providing a computer infrastructure being operable to: identify a set of devices of an infrastructure whose power consumption is to be projected; determine a maximum power consumption of the set of devices; determine a power adjustment factor for the set of devices, the power adjustment factor representing a typical level of power consumption as compared to the maximum power consumption; and adjust the maximum power consumption by the power adjustment factor to derive a projected power consumption for the set of devices.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description
II. Computerized Implementation

I. General Description

As described above, the present invention provides a way to more effectively estimate energy usage by a set (e.g., at least one) devices such as servers, including traditional mainframes as well as other enterprise systems. One core idea surrounds the fact that when detailed power consumption information is unavailable for a specific configuration, power consumption is computed/projected/estimated by downwardly adjusting (de-rating) the maximum power rating by a power adjustment factor that would more closely project the true power consumption. Under this approach, the power consumption is then provided as a range specifying probable expected lower and upper limits for a given device. This range is more meaningful for planning and decision-making and shows the client a more likely best and worst case energy consumption scenario for their specific device(s). Hence, it is helpful for planning or server comparison decisions. Cooling, energy costs, energy efficiency, and energy expanded per Million Instructions Per Second (MIPS) are also projected and given as a range instead of a single number. This gives the Information Technology (IT) decision maker more accurate information upon which to base IT decision-making.

It should be noted that although the examples set forth herein pertain to IT devices such as mainframes, servers, etc., the concepts here can be extrapolated out broadly to be applicable to any type of device/component that consumes power.

Figure 1:
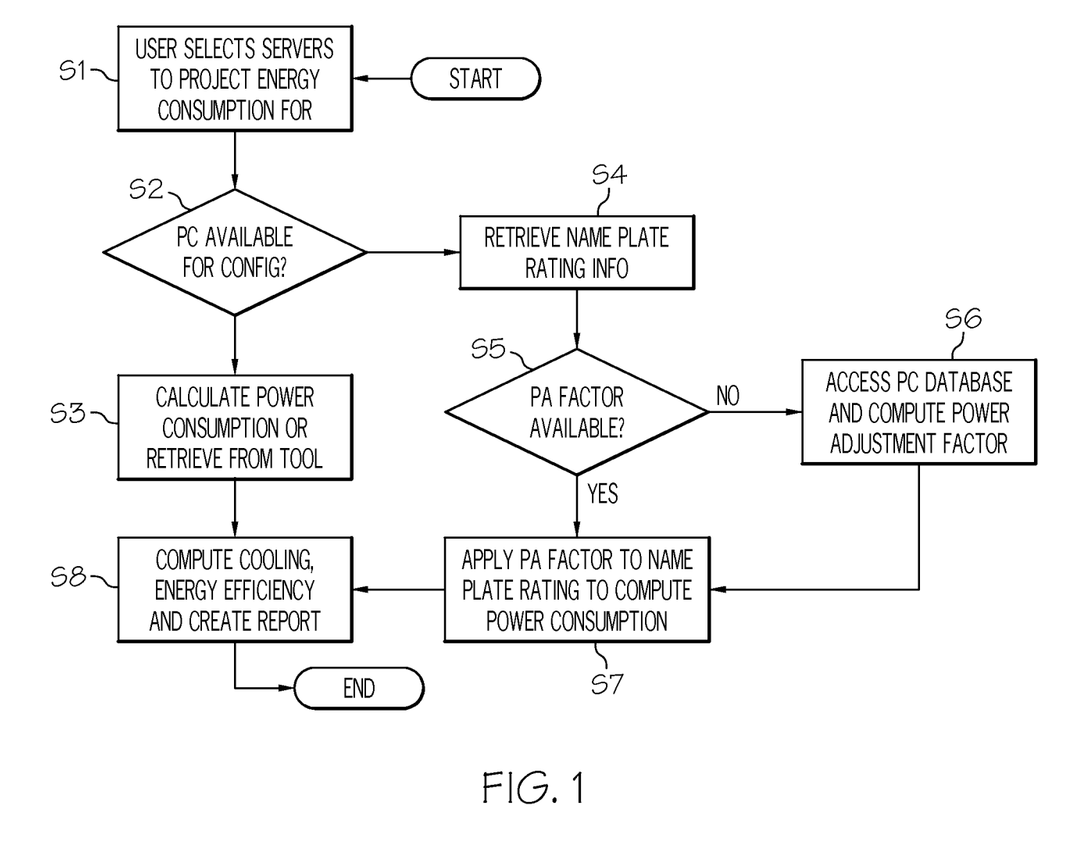
FIG. 1 shows a method flow diagram according to the present invention.

Referring now to FIG. 1, a method flow diagram according to the present invention is shown. In this example, the devices whose power consumption is to be projected are servers. However, as indicated above, this need not be the case. As depicted in step S1, a user will select servers whose energy/power consumption is to be projected. In step S2, it is determined whether power consumption information for the servers is readily available. If so, power consumption for the servers can be computed or retrieved from a tool in step S3. If not, rating information is retrieved from a name plate or other resource (device specifications) in step S4. Among the information retrieved is the maximum power consumption for each server. In step S5, it is determined whether a power adjustment factor (e.g., a maximum and minimum percentage range) is available. In many cases, the power consumed by a server is less than its maximum power rating. The power adjustment factor allows an adjustment (e.g., downward/reduced) of the maximum power consumption to reflect a typical amount actually consumed.

If the power adjustment factor is not readily available, it is computed in step S6 based upon a database of power consumption information such as historical power consumption information for similar devices (to be further described below). Once a power adjustment factor is known, it is applied in step S7 to the corresponding maximum power consumption to yield a project power consumption (e.g., for server device and/or for the set of servers as a whole). Then, a summary report or the like can be created and output in step S8.

ILLUSTRATIVE EXAMPLE 1

These steps will be further explained in the following illustrative examples:

Consider the case where client "Green, Inc." has two data centers in Dallas and in Austin, Tex. Green, Inc. wants to determine the energy impact to the Austin data center of moving three of the servers from the Dallas data center, and currently the Austin data center is close to the maximum power it can draw from the grid.

Power consumption information by feature code is unavailable for the servers in question, so Green, Inc. opts to use the name plate ratings for the servers to determine the increased energy requirements of the Austin data center. The nameplate numbers are often not easily accessible and readable, and will almost always overestimate the increased energy required. Under the present invention, power consumption data is loaded quickly for the servers in question, and a power adjustment factor reflective of typical power use is applied. For example, a power adjustment factor of 67-80% may be applied to this consumption information and Green, Inc. is shown a more realistic upper and lower limit of projected additional power consumption, cooling requirements, cost, and energy efficiency. Green, Inc. is now in a better position to make an informed decision on if they can afford the move of those servers to Austin. The limits used for the power adjustment factor are based on observed benchmarks for the particular servers.

In a typical embodiment, the power adjustment factor comprises an upper/maximum limit (e.g., 80%) and a lower/minimum limit (e.g., 67%) of the maximum power consumption for the device(s) in question. This information can be obtained in a variety of ways. Methods to include such a factor include database look-up based upon:

empirical (historical) energy usage of similarly configured systems, within the enterprise;

empirical (historical) energy usage of similarly configured systems, external to the enterprise, such as may be maintained by a services, hardware, or software provider;

estimated energy usage based upon specific, sub-device patterns (e.g., inclusion of eight disc drive adapters, rather than the full complement of 16, scales down consumption by a certain factor);

estimated energy usage based upon broad sub-device populations (e.g., 16 bays are fully populated, rather than the full 32, so consumption is scaled down by a certain factor);

estimated workloads within the server environment, based upon IT inputs (e.g., servers increasingly incorporate power savings into processors, so whether or not workloads permit such techniques to be of practical use may impact power usage). Other such scaling techniques may likewise be used.

In another embodiment, if no power adjustment factor is known, the tool/utility of the present invention will go out to a data base of power consumption information for similar servers and calculate a lower limit and upper limit to use as a power adjustment factor. This becomes a static power adjustment factor for the server under consideration. The algorithm will then de-rate the maximum given name plate rating and use this range as the power consumption projection for the server under consideration.

In yet another embodiment, the algorithm consults a database of power consumption for servers and calculates the lower and upper limit to use as a power adjustment factor. This will mean that the power adjustment factor is dynamic and as more data is populated into the source database, projections become increasingly accurate. The algorithm will then de-rate the maximum given name plate rating and use this range as the power consumption projection for the server under consideration.

ILLUSTRATIVE EXAMPLE 2

Figure 2:
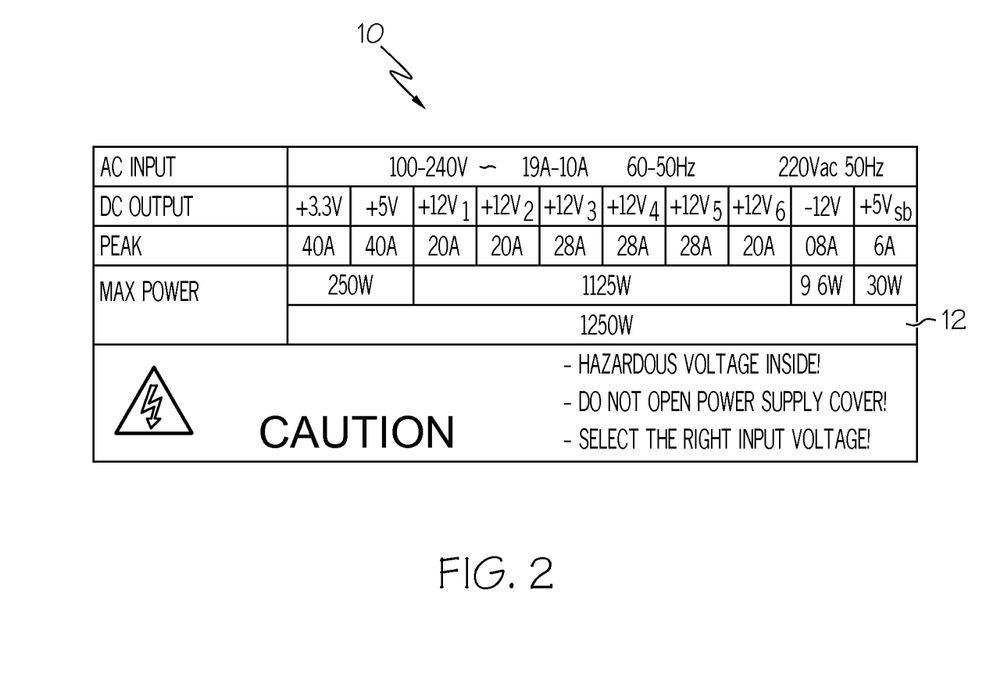
FIG. 2 shows a nameplate for a device whose power consumption can be projected according to the present invention.

As indicated above, one resource from which information can be extracted for use under the present invention is a device name plate (as referred to in step S4 of FIG. 1). An example of a name plate 10 is shown in FIG. 2. The present invention refers to the entity "name plate" with respect to being able to physically look at a device in order to determine power ratings. As can be seen in this example, the MAX POWER rating 12 for this device is 1250 Watts. With respect to a computer server, this rating would indicated the power used under fully loaded conditions.

ILLUSTRATIVE EXAMPLE 3

As indicated above, the present invention has the capability to consult a database of power consumption for devices (e.g., servers) to calculate the lower and upper limit to use as a power adjustment factor. This will mean that the power adjustment factor is dynamic, and as more data is populated into the source database, projections become increasingly accurate. The algorithm will then de-rate the maximum given name plate rating and use this range as the power consumption projection for the server under consideration.

In the case where there are no tools or direct methods available to measure power consumption and an extrapolation method must be used, this method becomes the preferred embodiment. In a preferred embodiment, a relational database would be used, as it provides advanced capabilities for search, sort, merge, insert data, delete data, and the like.

Figure 3A:
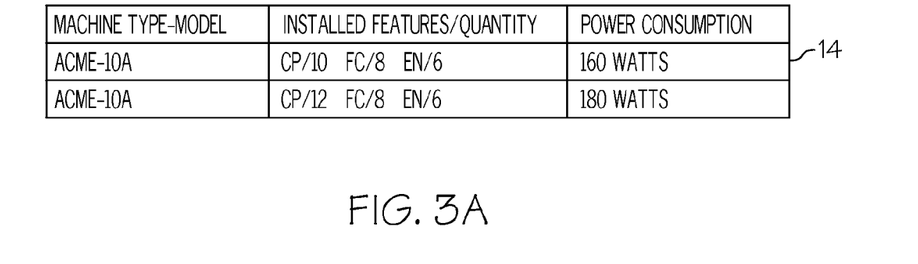
FIGS. 3A-C show tables used in projecting power consumption according to the present invention.

FIG. 3A provides a simplistic example of a database table 14 with sample row and column entries. It can be seen that the power range for the device referred to in FIG. 3A is from 160 to 180 watts. Further, noting that the only difference between the configured features is a quantity of 2 CP's, and the power rating differential between the machines is 20, it can be extrapolated that each CP consumes 10 watts. It can further be extrapolated that a quantity of 8 CP's+6 EN's consumes 60 watts. As the reader can derive from this example, many such extrapolations are possible, and over time as the sample size increases, increasingly accurate data may be obtained.

Figure 3B:
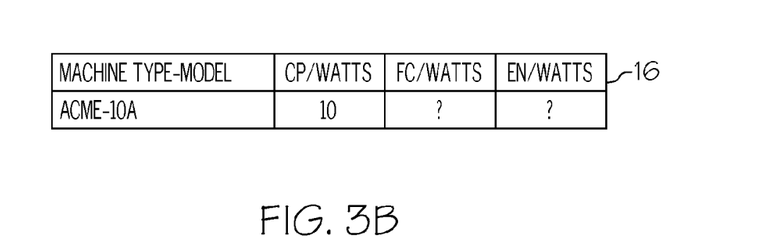

Continuing this discussion, it is also possible to build new summary tables as data is "learned" through this extrapolation process. Table 16 of FIG. 3B shows an example of such a summary table. In this example, only the power consumption of a CP has been determined, so the additional columns in the database table have not been populated. In an alternate embodiment, an equation of known data could populate the column as in the following: FC=(60/8FC+6EN). Using this method, once again, over time the calculated value becomes more accurate.

In yet another embodiment, a performance metric could be associated with the server, and a correlation drawn between relative performance and power consumption using the same techniques discussed above. As an example, mainframe systems measure performance using the MIPS metric (million instructions per second). Table 18 of FIG. 3C below depicts an example DB table using a performance metric.

Figure 3C:
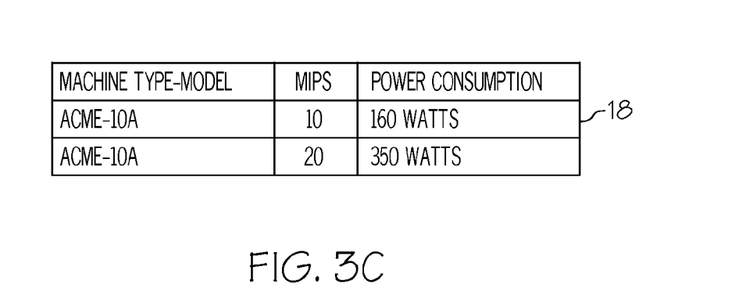

In this example, the two combined machines use 510 watts of power and have 30 MIPS of performance. Using a simple averaging method, based on this sample size, it can be estimated that 1 MIP of performance is equal to 17 watts of power consumption. Once again with this method, as the sample size increases, the average value becomes more accurate.

Thus, this present invention will enable IT decision makers to quickly understand the energy impact of their computational server decisions to the data center. The tool can easily be adapted for other IBM server platforms (power, modular systems) to perform similar energy analysis and provide reports. It can also be adapted for comparison between different vendor platforms. Updating the tool with server information requires relatively minimal effort.

II. Computerized Implementation

Figure 4:
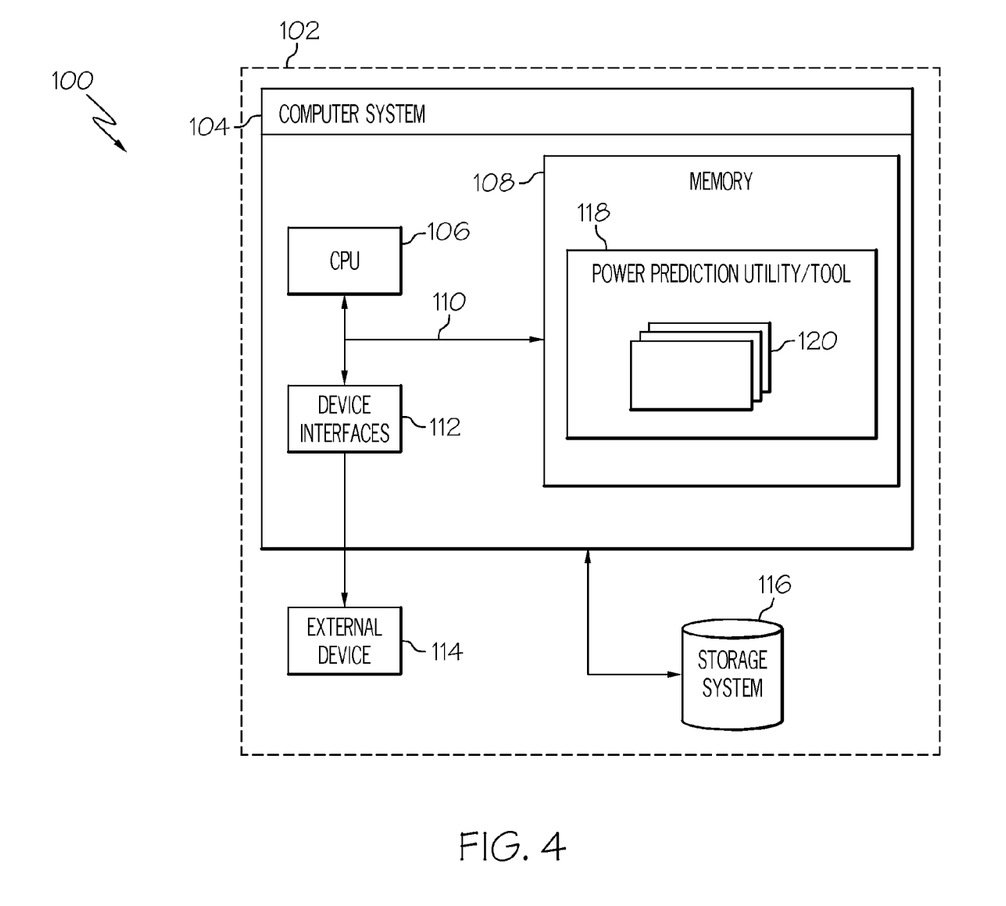
FIG. 4 shows a more specific computerized implementation for masking search queries according to an aspect to the present invention.

Referring now to FIG. 4, a computerized implementation 100 of the present invention is shown. As depicted, implementation 100 includes computer system 104 (e.g., physical machine 30) deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the devices of implementation 100 could be deployed, managed, serviced, etc., by a service provider who offers to implement, deploy, and/or perform the functions of the present invention for others.

As shown, computer system 104 includes a processing unit 106, a memory 108, a bus 110, and device interfaces 112. Further, computer system 104 is shown communicating with one or more external devices 106 that communicate with bus via device interfaces. In general, processing unit 106 executes computer program code, such as power projection tool/utility 118, which is stored in memory 108 and/or storage system 116. While executing computer program code, processing unit 106 can read and/or write data to/from memory 108, storage system 116, and/or device interfaces 112. Bus 110 provides a communication link between each of the devices in computer system 104. Computer system 104 could also communicate with one or more external devices 114 (such as a keyboard, a pointing device, a display, etc.); one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional devices (e.g., system software, math co-processing unit, etc.) not shown in FIG. 4 can be included in computer system 104.

Storage system 116 can be any type of system capable of providing storage for information under the present invention. To this extent, storage system 116 could include one or more storage devices (e.g., databases 12-18 of FIGS. 3A-C), such as a magnetic disk drive or an optical disk drive. In another embodiment, storage system 116 includes data distributed across, for example, a local area network (LAN), wide area network (WAN) or a storage area network (SAN) (not shown). In addition, although not shown, additional devices, such as cache memory, communication systems, system software, etc., may be incorporated into computer system 104.

Shown in memory 108 of computer system 104 is power projection utility/tool 118, which includes a set of modules 120. Set of modules 120 generally provides all functions of the present invention as described herein. Along these lines, set of modules 120 should be understood as including elements, devices, modules, etc., of FIGS. 1-4. Among other things, set of modules 120 is configured to identify a set of devices of an infrastructure whose power consumption is to be projected; determining a maximum power consumption of the set of devices; determining a power adjustment factor if the set of devices, the power adjustment factor representing a typical level of power consumption as compared to the maximum power consumption; adjusting the maximum power consumption by the power adjustment factor to derive a projected power consumption for the set of devices; and/or generate and output any reports.

While shown and described herein as a power consumption projection solution, it is understood that the invention further provides various alternative embodiments. For example, in one embodiment, the invention provides a computer-readable/useable storage medium that includes computer program code to enable a computer infrastructure to provide power consumption projection functionality as discussed herein. To this extent, the computer-readable/useable storage medium includes program code that implements each of the various processes of the invention. It is understood that the terms computer-readable storage medium or computer useable medium comprise one or more of any type of physical embodiment of the program code. In particular, the computer-readable/useable storage medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.

In another embodiment, the invention provides a business method that performs the process of the invention on a subscription, advertising, and/or fee basis. That is, a service provider, such as a Solution Integrator, could offer to provide power consumption projection. In this case, the service provider can create, maintain, support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing power consumption projection functionality. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 4), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, device software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for projecting power consumption, comprising:
   identifying a set of devices of an infrastructure whose power consumption is to be projected;
   determining a maximum power consumption of the set of devices;
   determining a power adjustment factor for the set of devices, the power adjustment factor representing an upper limit and a lower limit of the maximum power consumption typically consumed by devices similar to the set of devices; and
   adjusting the maximum power consumption of the set of devices by the power adjustment factor to derive a projected power consumption for the set of devices;

wherein the power adjustment factor dynamically changes in response to updates in historical power consumption information associated with the devices similar to the set of devices.

2. The method of claim 1, maximum power consumption and the power adjustment factor being determined individually for each of the set of devices.

3. The method of claim 1, the maximum power consumption being determined from a name plate for each of the set of devices.

4. The method of claim 1, the power adjustment factor being determined from a database of power consumption information corresponding to the set of devices.

5. The method of claim 4, the database of power consumption information being based on historical power consumption information associated with devices similar to the set of devices.

6. The method of claim 1, the power adjustment factor comprising a percentage range of the maximum power consumption that the set of devices typically consume.

7. The method of claim 6, the adjusting comprising reducing the maximum power consumption by the percentage range to provide an upper projected power consumption and a lower projected power consumption.

8. A data processing system for projecting power consumption, comprising:
   a memory medium comprising instructions; a bus coupled to the memory medium; and a processor coupled to the bus that when executing the instructions causes the data processing system to identify a set of devices of an infrastructure whose power consumption is to be projected;
   determine a maximum power consumption of the set of devices;
   determine a power adjustment factor for the set of devices, the power adjustment factor representing an upper limit and a lower limit of the maximum power consumption typically consumed by devices similar to the set of devices; and
   adjust the maximum power consumption of the set of devices by the power adjustment factor to derive a projected power consumption for the set of devices;
   wherein the power adjustment factor dynamically changes in response to updates in historical power consumption information associated with the devices similar to the set of devices.

9. The data processing system of claim 8, maximum power consumption and the power adjustment factor being determined individually for each of the set of devices.

10. The data processing system of claim 8, the maximum power consumption being determined from a name plate for each of the set of devices.

11. The data processing system of claim 8, the power adjustment factor being determined from a database of power consumption information corresponding to the set of devices.

12. The data processing system of claim 11, the database of power consumption information being based on historical power consumption information associated with devices similar to the set of devices.

13. The data processing system of claim 8, the power adjustment factor comprising a percentage range of the maximum power consumption that the set of devices typically consume.

14. The data processing system of claim 13, the data processing system further being caused to reduce the maximum power consumption by the percentage range to provide an upper projected power consumption and a lower projected power consumption.

15. A computer readable storage medium containing a program product for projecting power consumption, the computer readable storage device comprising program code for causing a computer to:
   identify a set of devices of an infrastructure whose power consumption is to be projected;
   determine a maximum power consumption of the set of devices;
   determine a power adjustment factor for the set of devices, the power adjustment factor representing an upper limit and a lower limit of the maximum power consumption typically consumed by devices similar to the set of devices; and
   adjust the maximum power consumption of the set of devices by the power adjustment factor to derive a projected power consumption for the set of devices;
   wherein the power adjustment factor dynamically changes in response to updates in historical power consumption information associated with the devices similar to the set of devices.

16. The computer readable storage medium containing the program product of claim 15, maximum power consumption and the power adjustment factor being determined individually for each of the set of devices.

17. The computer readable storage medium containing the program product of claim 15, the maximum power consumption being determined from a name plate for each of the set of devices.

18. The computer readable storage medium containing the program product of claim 15, the power adjustment factor being determined from a database of power consumption information corresponding to the set of devices.

19. The computer readable storage medium containing the program product of claim 18, the database of power consumption information being based on historical power consumption information associated with devices similar to the set of devices.

20. The computer readable storage medium containing the program product of claim 15, the power adjustment factor comprising a percentage range of the maximum power consumption that the set of devices typically consume.

21. The computer readable storage medium containing the program product of claim 20, the computer readable storage medium further comprising program code for further causing the computer to reduce the maximum power consumption by the percentage range to provide an upper projected power consumption and a lower projected power consumption.

22. A method for deploying a system for projecting power consumption, comprising:
   providing a computer infrastructure being operable to:
      identify a set of devices of an infrastructure whose power consumption is to be projected;
      determine a maximum power consumption of the set of devices;
      determine a power adjustment factor the set of devices, the power adjustment factor representing an upper limit and a lower limit of the maximum power consumption typically consumed by devices similar to the set of devices; and
      adjust the maximum power consumption of the set of devices by the power adjustment factor to derive a projected power consumption for the set of devices;
      wherein the power adjustment factor dynamically changes in response to updates in historical power consumption information associated with the devices similar to the set of devices.

* * * * *